(12) United States Patent
Lee (10) Patent No.: US 9,042,144 B1
(45) Date of Patent: May 26, 2015

(54) HIGH VOLTAGE RECTIFIER AND VOLTAGE DOUBLER USING LOW VOLTAGE CMOS PROCESS TRANSISTORS

(71) Applicant: ALFRED E. MANN FOUNDATION FOR SCIENTIFIC RESEARCH, Santa Clarita, CA (US)

(72) Inventor: Edward K. F. Lee, Fullerton, CA (US)

(73) Assignee: ALFRED E. MANN FOUNDATION FOR SCIENTIFIC RESEARCH, Santa Clarita, CA (US)

( * ) Notice: Subject to any disclaimer, the term of this patent is extended or adjusted under 35 U.S.C. 154(b) by 48 days.

(21) Appl. No.: 13/917,426

(22) Filed: Jun. 13, 2013

Related U.S. Application Data

(63) Continuation of application No. 13/103,754, filed on May 9, 2011, now Pat. No. 8,472,221.

(60) Provisional application No. 61/332,475, filed on May 7, 2010.

(51) Int. Cl.
*H02M 7/217* (2006.01)
*H02M 5/42* (2006.01)
*H02M 7/06* (2006.01)

(52) U.S. Cl.
CPC ............... *H02M 7/06* (2013.01); *H02M 7/217* (2013.01)

(58) Field of Classification Search
USPC ........... 363/52, 53, 59, 60, 81, 82, 84, 86–92, 363/125, 127
See application file for complete search history.

(56) References Cited

U.S. PATENT DOCUMENTS

| 3,703,709 | A | * | 11/1972 | Matsue | 365/49.11 |
|---|---|---|---|---|---|
| 4,745,395 | A | * | 5/1988 | Robinson | 341/135 |
| 5,581,455 | A | * | 12/1996 | Rossi et al. | 363/60 |
| 5,870,031 | A | * | 2/1999 | Kaiser et al. | 340/10.34 |
| 6,275,402 | B1 | * | 8/2001 | Jun | 363/127 |
| 7,969,232 | B2 | * | 6/2011 | Chang et al. | 327/536 |
| 2002/0060919 | A1 | * | 5/2002 | Gharpurey | 363/125 |
| 2003/0112645 | A1 | * | 6/2003 | Schlecht | 363/89 |
| 2008/0315849 | A1 | * | 12/2008 | Gerritsen | 323/282 |
| 2010/0164289 | A1 | * | 7/2010 | Umminger et al. | 307/55 |
| 2011/0050318 | A1 | * | 3/2011 | Lee | 327/333 |
| 2011/0124310 | A1 | * | 5/2011 | Theilmann et al. | 455/343.1 |
| 2013/0083573 | A1 | * | 4/2013 | Ryu | 363/60 |

* cited by examiner

*Primary Examiner* — Timothy J Dole
*Assistant Examiner* — Yusef Ahmed
(74) *Attorney, Agent, or Firm* — Malcolm J. Romano (57) ABSTRACT

A high voltage full wave rectifier and doubler circuit having complementary serially connected low voltage MOSFET stacks to provide high voltage capability. The state of the MOSFETs in the MOSFET stacks is controlled by means of resistors coupled between the circuit's outputs and a time varying input signal. The resistance values of the resistors are selected to maintain operation of the stacked MOSFETs below their breakdown voltages.

9 Claims, 8 Drawing Sheets

HIGH VOLTAGE RECTIFIER AND VOLTAGE DOUBLER USING LOW VOLTAGE CMOS PROCESS TRANSISTORS

CROSS REFERENCE TO RELATED APPLICATIONS

This application is a continuation of U.S. application Ser. No. 13/103,754 filed on May 9, 2011, which claims the benefit under 35. U.S C. 119(e) of U.S. Provisional Application No. 61/332,475, filed on May 7, 2010, both of which are incorporated herein by reference in their entirety.

FIELD

The disclosure relates generally to electronic integrated circuits. In particular, it relates to high voltage full wave rectifier and voltage doubler circuits utilizing an exemplary 0.18 um CMOS process for transistors arranged in series circuit configuration to facilitate usage of low voltage transistors in high voltage applications.

BACKGROUND

Implantable biomedical devices have been developed for different applications such as retinal prosthesis, cochlear implant, and arm rehabilitation.

As an example, "A 232-channel epiretinal stimulator ASIC," by M. Ortmanns et al., IEEE Journal of Solid-State Circuits, Vol. 42, pp. 2946-2959, December 2007, which is incorporated herein by reference in its entirety, describes implantable biomedical devices developed for retinal prosthesis. Other examples include: "A 32-Site 4-Channel Cochlear Electrode Array," by P. Bhatti et al., ISSCC Dig. Tech. Papers, pp. 50-51, February 2006, which is incorporated herein by reference in its entirety, describes implantable biomedical devices developed for cochlear implants and "A Biomedical Implantable FES Battery-Powered Micro-Stimulator," by E. Matei et al., Proc. IEEE 2008 CICC, pp. 317-324, September 2008, which is incorporated herein by reference in its entirety, describes implantable biomedical devices developed for arm rehabilitation.

Implantable biomedical devices are usually powered by inductive coupling directly from a radio frequency (RF) field or from a rechargeable battery that is recharged by means of inductive coupling with an external RF field.

Figure 1:
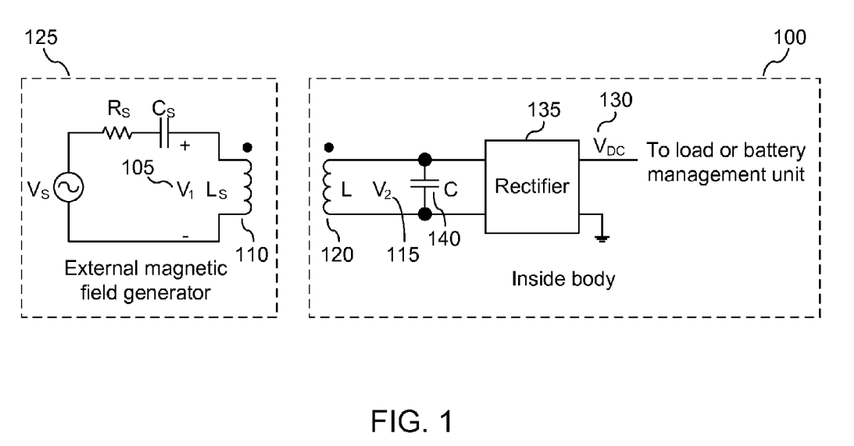
FIG. 1 shows an exemplary implementation of an inductively powered device.

FIG. 1 shows an exemplary implementation of an inductively powered implantable medical device (100) used in both the case of implantable biomedical devices powered by inductive coupling from an RF field directly as well as from a rechargeable battery managed by a battery management unit. As shown in FIG. 1, a primary voltage $V_1$ (105) from a first coil $L_S$ (110) induces a voltage $V_2$ (115) in a second coil L (120). More specifically, the coil L (120) located inside the implantable device (100) receives power by means of magnetic coupling from an external magnetic field generator (125). In general, overall power consumption for most implantable biomedical devices (100) is relatively low, usually not exceeding tens of milliwatts.

The induced voltage $V_2$ (115) is rectified and converted to a DC voltage $V_{DC}$ (130) by a rectifier (135). The DC voltage $V_{DC}$ (130) is used for powering circuits in the implantable device (100) directly or for recharging a battery in the implantable device (100). Peak to peak induced voltage $V_2$ (115), denoted as $V_{2Pk-Pk}$, depends on a number of factors such as:

(a) design of coil $L_S$ (110) and coil L (120) including the turns ratio,
(b) equivalent load seen by the circuit comprising coil L (115) and a tuning capacitor C (140),
(c) magnitude of the external magnetic field provided by generator (125), and
(d) distance between and orientation of coil $L_S$ (110) and coil L (120).

The peak to peak voltage $V_{2Pk-Pk}$ of the induced voltage $V_2$ (115) can range from a few volts to around 20 V.

In the following figures, NMOSs and PMOSs will be used in exemplary implementations of circuit devices. The NMOS has a threshold voltage denoted as $V_{TN}$ and the PMOS has a threshold voltage denoted as $V_{TP}$. A typical value for the threshold voltages is 0.5 volts for an exemplary 0.18 um CMOS process.

Figure 2A:
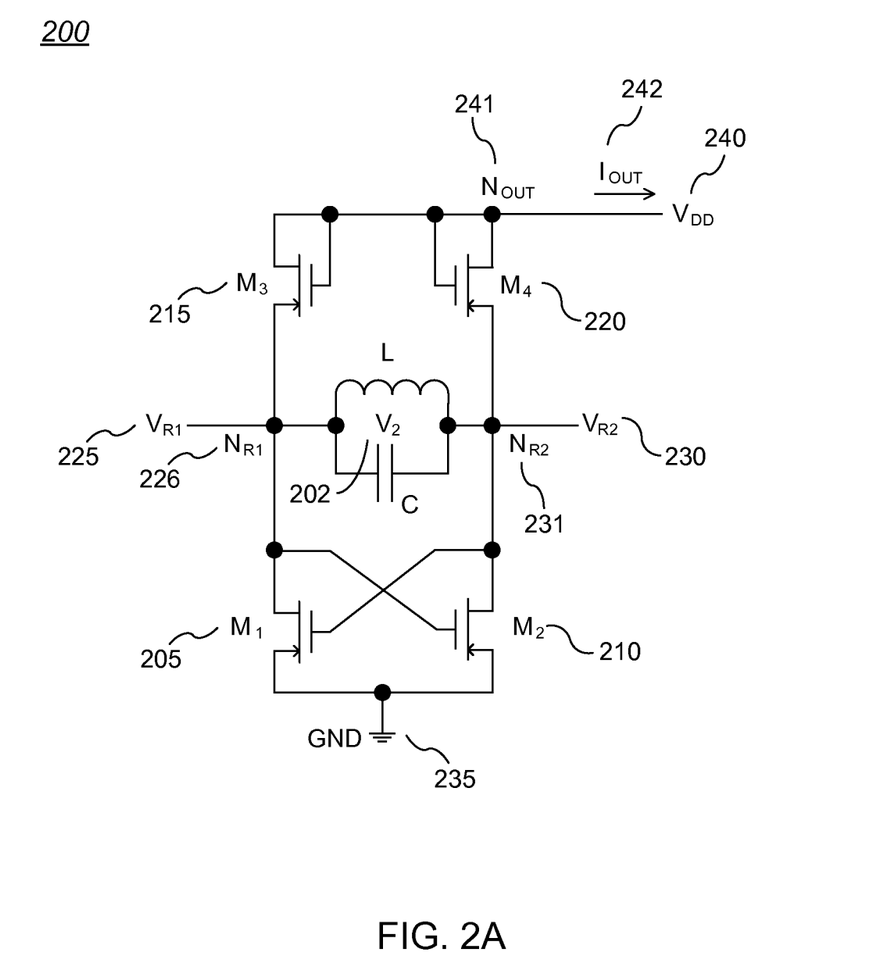
FIG. 2A shows an exemplary implementation of a conventional CMOS full wave rectifier comprising cross coupled NMOSs and PMOSs used as diodes.
Figure 2B:
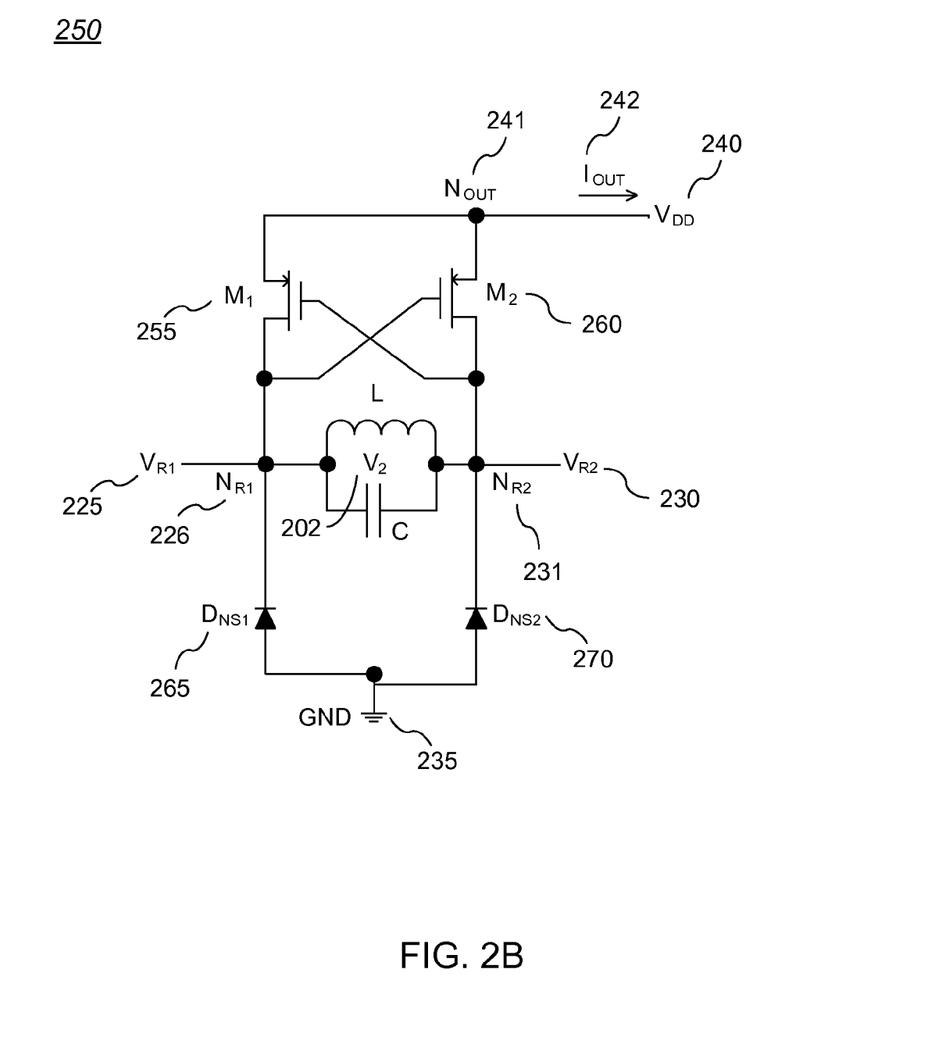
FIG. 2B shows an exemplary implementation of a conventional CMOS full wave rectifier comprising cross coupled PMOSs and diodes.

FIGS. 2A and 2B show two exemplary implementations of conventional CMOS full wave rectifier circuits and it is instructive to discuss operation of these circuits in detail in order to gain a better understanding of the novel advancement the current invention provides over the present state of the art.

FIG. 2A shows a first implementation of a conventional CMOS full wave rectifier circuit (200). The implementation in FIG. 2A comprises a first NMOS field effect transistor (FET) $M_1$ (205), a second NMOS FET $M_2$ (210), a first diode connected PMOS FET $M_3$ (215), and a second diode connected PMOS FET $M_4$ (220). A diode connected FET is referred to in a configuration when a FET gate and drain are connected together so that the FET functions as a diode. The drain of the first NMOS FET $M_1$ (205) is connected to the source of the first PMOS FET $M_3$ (215) and the drain of the second NMOS FET $M_2$ (210) is connected to the source of the second PMOS FET $M_4$ (220). The two NMOS FETs $M_1$ (205) and $M_2$ (210) are connected together in what is referred to as a cross coupled arrangement. In particular, the gate of the first NMOS FET $M_1$ (205) is connected to the drain of the second NMOS FET $M_2$ (210) and the gate of the second NMOS FET $M_2$ (210) is connected to the drain of the first NMOS FET $M_1$ (205).

An induced voltage $V_2$ (202) is a difference between voltage $V_{R1}$ (225) appearing at node $N_{R1}$ (226) and voltage $V_{R2}$ (230) appearing at node $N_{R2}$ (231), namely $V_2 = V_{R1} - V_{R2}$. When NMOS FET $M_1$ (205) is conducting (or "ON"), node $N_{R1}$ (226) is connected to ground (235). Similarly, when NMOS FET $M_2$ (210) is conducting, node $N_{R2}$ (231) is connected to ground (235). Voltages 225 or 230, at nodes 226 or 231 respectively, are applied to output node $N_{OUT}$ (241) by means of diode connected PMOS FET (215 or 220) and supply an output current $I_{OUT}$ (242) to a load circuit (not shown).

Operation of the circuit of FIG. 2A is as follows: consider a case when the induced voltage $V_2$ (202) is at a peak value $V_{2P}$ with the voltage $V_{R1}$ (225) at its maximum value and the voltage $V_{R2}$ (230) at its minimum value.

The second NMOS FET $M_2$ (210) has the voltage $V_{R2}$ (230) applied to its drain, the voltage $V_{R1}$ (225) applied to its gate, and the ground terminal (235) tied to its source. The second NMOS FET $M_2$ (210) operates in the triode mode since $V_{GS2} = V_{R1} > V_{TN}$ and $V_{GD2} = V_{R1} - V_{R2} > V_{TN}$, where $V_{GS2}$ is the gate-to-source voltage of the NMOS FET $M_2$ (205) and $V_{GD2}$ is the gate to drain voltage of the NMOS FET $M_2$ (210) The second NMOS FET $M_2$ (210) is turned on (conductive) and node $N_{R2}$ (231) is tied to the ground terminal (235). Therefore, current flows from node $N_{R2}$ (231) to the ground terminal (235).

The first NMOS FET $M_1$ (205) has the voltage $V_{R1}$ (225) applied to its drain, the voltage $V_{R2}$ (230) applied to its gate, and the ground terminal (235) tied to its source. The first NMOS FET $M_1$ (205) operates in cutoff mode because $V_{GS1}=V_{R2}<V_{TN}$, where $V_{GS1}$ is the gate-to-source voltage of the NMOS FET $M_1$ (205). Therefore, no significant current flows through the NMOS FET $M_1$ (205).

The voltage $V_{R1}$ (225) appearing at $N_{R1}$ (226) is sufficiently large so as to turn on the diode connected PMOS FET $M_3$ (215). The node $N_{R1}$ (226) is tied to output node $N_{OUT}$ (241), and thus the voltage $V_{R1}$ (225) minus a voltage drop typically in the range of 0.5 to 1.0 volts due to the diode connected PMOS FET $M_3$ (215) is applied to the load circuit (not shown). The voltage $V_{R1}$ (225) minus a voltage drop due to the diode connected PMOS FET $M_3$ (215) is denoted as an output voltage $V_{DD}$ (240) in FIG. 2A.

A similar case exists when the voltage $V_{R2}$ (230) is at a maximum value and the voltage $V_{R1}$ (225) is at a minimum value. The first NMOS FET $M_1$ (205) operates in a triode mode and thus node $N_{R1}$ (226) is tied to the ground terminal (235). The second NMOS FET $M_2$ (210) operates in cutoff mode. The voltage $V_{R2}$ (230) turns on the diode connected PMOS FET $M_4$ (220), and thus the voltage $V_{R2}$ (230) minus a voltage drop due to the diode connected PMOS FET $M_4$ (220) is applied to the load circuit (not shown). In this case, the output voltage $V_{DD}$ (240) in FIG. 2A is the voltage $V_{R2}$ (230) minus a voltage drop due to the diode connected PMOS FET $M_4$ (220).

A technical paper entitled "Fully Integrated Wideband High-Current Rectifiers for Inductively Powered Devices," by M. Ghovanloo and K. Najafi, IEEE Journal of Solid-State Circuits, Vol. 39, No. 11, pp. 1976-1984, November 2004, which is incorporated herein by reference in its entirety, proposes a technique to prevent a latch-up condition due to parasitic bipolar transistors associated with the PMOS FETs (215, 220).

FIG. 2B shows a second implementation (250) of a conventional CMOS full wave rectifier. The implementation in FIG. 2B comprises a first PMOS FET $M_1$ (255), a second PMOS FET $M_2$ (260) in a cross coupled arrangement, a first diode $D_{NS1}$ (265), and a second diode $D_{NS2}$ (270). In particular, the gate of the first PMOS FET $M_1$ (255) is connected to the drain of the second PMOS FET $M_2$ (260) and the gate of the second PMOS FET $M_2$ (260) is connected to the drain of the first PMOS FET $M_1$ (255). The bulk terminals of the PMOS FETs (255, 260) are connected to the output voltage $V_{DD}$ (240).

The diodes $D_{NS1}$ (265) and $D_{NS2}$ (270) connect either node $N_{R1}$ (226), at which voltage $V_{R1}$ (225) appears, or node $N_{R2}$ (231), at which voltage $V_{R2}$ (230) appears, to the ground terminal (235). The voltage 225 or 230 is applied to the load circuit (not shown) and supplies the output current $I_{OUT}$ (242) through the corresponding PMOS FETs 255 or 260.

The following analysis is similar to that given in relation to FIG. 2A. The first diode $D_{NS1}$ (265) has the voltage $V_{R1}$ (225) applied to its cathode and the ground terminal (235) tied to its anode. The second diode $D_{NS2}$ (270) has the voltage $V_{R2}$ (230) applied to its cathode and the ground terminal (235) tied to its anode.

Consider a case when the induced voltage $V_2$ (202) is at the peak value $V_{2P}$ with the voltage $V_{R1}$ (225) at its maximum value and the voltage $V_{R2}$ (230) at its minimum value. Diode $D_{NS1}$ (265) is reverse biased since its cathode is positive relative to its anode. The diode $D_{NS2}$ (270) is forward biased since its cathode is negative relative to its anode. The node $N_{R2}$ (231) is thus tied to the ground terminal (235). Consequently, current flows from node $N_{R2}$ (231) to the ground terminal (235) whereas no significant current flows from node $N_{R1}$ (226) to the ground terminal (235).

The second PMOS FET $M_2$ (260) has the voltage $V_{R2}$ (230) applied to its drain, the voltage $V_{R1}$ (225) applied to its gate, and the output node $N_{OUT}$ (241) tied to its source. The second PMOS FET $M_2$ (260) operates in cutoff mode because $V_{GS2}=V_{R1}-V_{DD}>V_{TP}$, where $V_{GS2}$ is the gate-to-source voltage of the PMOS FET $M_2$ (260). Consequently, no current flows from the second node $N_{R2}$ (231) to the output node $N_{OUT}$ (241).

The first PMOS FET $M_1$ (255) has the voltage $V_{R1}$ (225) applied to its drain, the voltage $V_{R2}$ (230) applied to its gate, and the output node $N_{OUT}$ (241) tied to its source. The first PMOS FET $M_1$ (255) operates in triode mode because $V_{GS1}=V_{R2}-V_{DD}<V_{TP}$ and $V_{DG1}=V_{R1}-V_{R2}>|V_{TP}|$, where $V_{GS1}$ is the gate-to-source voltage of the PMOS $M_1$ (255) and $V_{DG1}$ is the drain-to-gate voltage of the PMOS FET $M_1$ (255). Consequently, the first PMOS FET $M_1$ (255) is turned on and node $N_{R1}$ (231) is tied to output node $N_{OUT}$ (241). As a result, current flows from node $N_{R1}$ (226) through the first PMOS FET $M_1$ (255) to the output node $N_{OUT}$ (241). The voltage $V_{R1}$ (225) minus a small voltage drop due to the diode $D_{NS2}$ (270) is applied to the load circuit (not shown). This small voltage drop is typically in the range of tens of mV and can be neglected typically for a large width-length ratio for the PMOS FET $M_1$ (255). The voltage $V_{R1}$ (225) minus a voltage drop due to the diode $D_{NS1}$ (265) is denoted as the output voltage $V_{DD}$ (240) in FIG. 2B.

A similar case exists when the voltage $V_{R2}$ (230) is at a maximum value and the voltage $V_{R1}$ (225) is at a minimum value. The first diode $D_{NS1}$ (265) is forward biased and thus ties the first node $N_{R1}$ (226) to the ground terminal (235) and the second diode $D_{NS2}$ (270) is reverse biased. The voltage $V_{R2}$ (230) turns on the PMOS FET $M_2$ (260), and thus the voltage $V_{R2}$ (230) minus a voltage drop due to the PMOS FET $M_2$ (260) is applied to the load circuit (not shown). In this case, the output voltage $V_{DD}$ (240) in FIG. 2A is the voltage $V_{R2}$ (230) minus a voltage drop due to the PMOS FET $M_2$ (260).

For both conventional rectifiers shown in FIGS. 2A and 2B, the voltages across different terminals of the PMOS FETs and/or NMOS FETs will typically see the full swing of the induced voltage. Therefore, the breakdown voltages or the voltage limits of these FETs (typically in the range of ~3.6V for a conventional 0.18 μm CMOS process) have to be higher than the peak induced voltage such that stress conditions will not occur on these FETs. As a result, an induced voltage with large peak value (>~3.6V) cannot be applied on these conventional rectifiers.

SUMMARY

To address the shortcomings and deficiencies of the current state of the art, the present invention discloses a high voltage full wave rectifier circuit having complementary serially connected low voltage MOSFET stacks to provide high voltage rectifier capability. In particular, the MOSFET stacks are coupled to a pair of cross coupled MOSFETs that provide a full wave rectified output voltage. The state of the MOSFETs in the MOSFET stacks is controlled by means of a plurality of serially connected resistors coupled between the rectifier output and the time varying input signal. A pair of diodes is connected between ground and the MOSFET stacks. A plurality of diode connected MOSFETs are connected between the rectifier output and the resistors to establish bias voltages on the gates of the MOSFETs in the MOSFET stacks to control operation of the rectifier during input voltage cycles.

A voltage doubler circuit is also described where low voltage MOSFETs are utilized in a novel configuration to provide high voltage doubling capability.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 2A and 2B show exemplary implementations of conventional CMOS full wave rectifiers.

DETAILED DESCRIPTION

Figure 3:
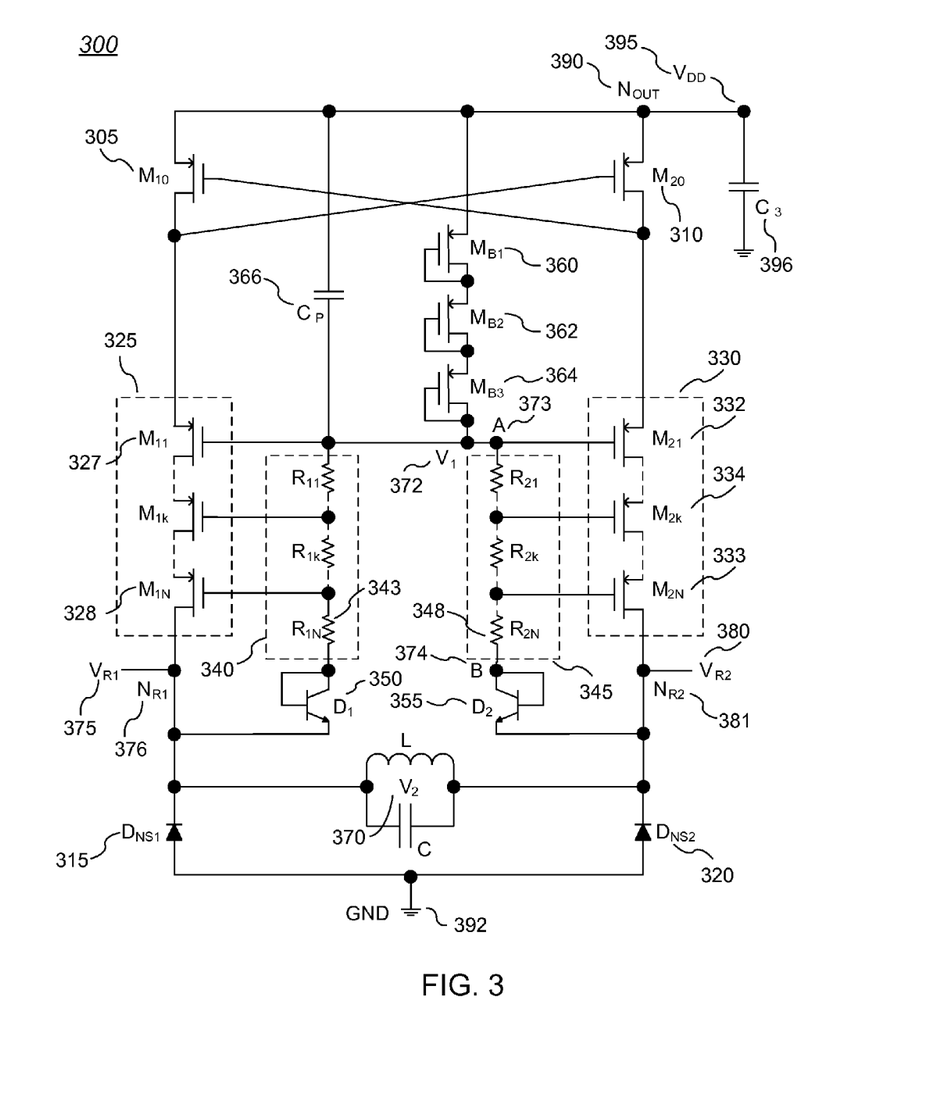
FIG. 3 shows an exemplary embodiment of a high voltage full wave rectifier according to the present disclosure.
Figure 5:
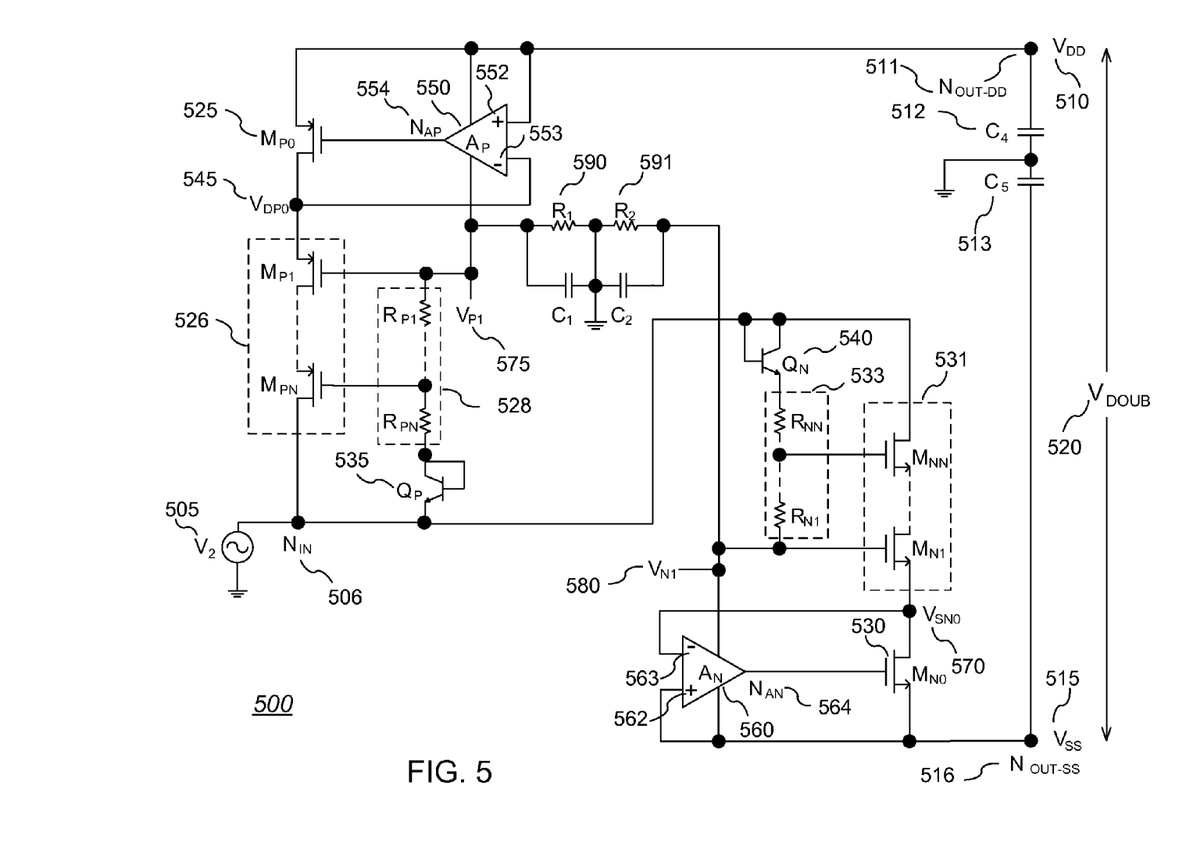
FIG. 5 shows an exemplary embodiment of a high voltage (HV) voltage doubler.

The maximum voltage limit across exemplary 3.3 V transistor terminals, including the bulk terminal, is usually around 3.6 V. Nevertheless, breakdown voltages for different well diodes in a process utilizing DNWell/p-substrate diodes and NWell/p-substrate diodes are usually higher. The breakdown voltages of the diodes determine the maximum input voltage for various devices, including an exemplary embodiment of a high voltage full wave rectifier that is shown in FIG. 3 and an exemplary embodiment of a HV voltage doubler that is shown in FIG. 5. For an exemplary 0.18 µm CMOS process, the diodes utilized in the process generally have breakdown voltages higher than 14 V.

Some applications require an induced voltage $V_2$ (115), shown in FIG. 1, with a high peak value $V_{2P}$. As an example of such an application, with reference to the implantable device (100) in FIG. 1, stimulation of nerve tissues using current pulses is performed using a DC voltage $V_{DC}$ (130). The DC voltage $V_{DC}$ (130) is at a high value in order to accommodate different stimulation current pulse amplitudes and tissue impedances. The DC voltage $V_{DC}$ (130) is generally obtained from the induced voltage $V_2$ (115) directly after rectification and conversion by the rectifier (135), without any additional DC to DC converters.

Continued reference is made to the example of stimulation of nerve tissues. Since high values are generally desired for the DC voltage $V_{DC}$ (130) in such an application, integrated circuit (IC) processes used for this application is adapted to withstand high voltages. Since the implantable device (100) further comprises other circuits for control, signal processing, and wireless communication, a two-chip solution comprises one high voltage IC used for nerve tissue stimulation and one low voltage IC used for the circuit functions of controlling, processing, and communicating. However, the two-chip solution increases complexity in assembling the implantable device (100) due to the small size of many implantable devices (100).

Alternatively, IC processes providing both low voltage and high voltage capabilities on the same chip can be used. However, choices for such an IC are limited and the low-voltage devices in such a process may not perform as well as the devices available in advanced CMOS processes. As a result, some advantages available from advanced CMOS processes such as high logic density and low power consumption may be sacrificed for IC processes that provide both low voltage and high voltage capabilities on the same chip. Therefore, it would be advantageous if the high voltage circuits can be implemented using conventional low-voltage CMOS processes.

The present disclosure describes a high voltage full wave rectifier and a high voltage (HV) voltage doubler that can uses conventional low-voltage CMOS devices. Both the high voltage full wave rectifier and the HV voltage doubler achieve high voltage operation by stacking a number of transistors typically NMOS and PMOS field effect transistors that are normally used in low voltage applications. In this context stacking refers to connecting a plurality of transistors in series circuit arrangement wherein for example, the drain of the first transistor in the series is connected to the source of the second transistor in the series and the drain of the second transistor is connected to the source of the third transistor in the series, and so on. Moreover, it is to be understood that, although the example embodiment of the high voltage full wave rectifier discussed herein relies on the use of PMOS devices, NMOS devices may also be used taking into account the appropriate voltage polarity considerations known and appreciated by those skilled in the art. Furthermore, it is to be understood that with reference to components or devices that are "coupled" to other components, devices, voltage and current sources and ground, etc. The term coupled includes the instance when the coupling is "direct" meaning that no other components are involved in the path from the subject device or component to its defined terminus and the instance when the coupling is "indirect" meaning that other devices or components may lie in the path from the subject device or component to its defined terminus. Use of the high voltage full wave rectifier and the HV voltage doubler in high voltage circuits allow integration of the high voltage circuits with other low-voltage analog/RF circuits and digital circuits in the same advanced process.

High Voltage Full Wave Rectifier Design

FIG. 3 shows an embodiment of a high voltage full wave rectifier (300) in accordance with the present disclosure. In the embodiment shown in FIG. 3, as already shown in FIG. 2B, the high voltage full wave rectifier (300) comprises PMOS FET $M_{10}$ (305), PMOS FET $M_{20}$ (310), diode $D_{NS1}$ (315), and diode $D_{NS2}$ (320). In the present embodiment, the diodes (315, 320) are NWell/p-substrate diodes. It is to be noted that the terms PMOS FET and NMOS FET and FET may be used interchangeably. As should be understood, the four components (305, 310, 315, 320) provide the overall rectification function of rectifier (300). A filter capacitor $C_3$ (396) is connected between output node $N_{OUT}$ (390) and ground for output signal smoothing.

The embodiment shown in FIG. 3 however comprises additional components that provide high voltage operation. In particular, the high voltage rectifier (300) further comprises a first PMOS FET stack (325) comprising (N) PMOS FETs $M_{11}$ (327) through $M_{1N}$ (328) and a second PMOS FET stack (330) comprising (N) PMOS FETs $M_{21}$ (332) through $M_{2N}$ (333). As is shown in FIG. 3, the drain of the last PMOS FET $M_{1N}$ (328) in the first PMOS FET stack (325) is connected to the cathode of diode $D_{NS1}$ (315) and the drain of the last PMOS FET $M_{2N}$ (333) in the second PMOS stack (330) is connected to the cathode of diode $D_{NS2}$ (320). Although three FETs are shown in respective FET stacks (325) and (330), other numbers of FETs may be used at the discretion of the designer depending upon the operating voltage range of the rectifier.

Additionally, with continued reference to FIG. 3, the HV rectifier (300) further comprises a first resistor ladder (340) comprising N resistors $R_{11}$ through $R_{1N}$ (343) connected to the gates of the respective FETs in the first FET stack (325) and a second resistor ladder (345) comprising N resistors $R_{21}$ through $R_{2N}$ (348) connected to the gates of the respective FETs in the second FET stack (330). The last resistor $R_{1N}$ (343) in the first resistor ladder (340) is connected to a diode connected bipolar junction transistor (BJT) $D_1$ (350). The diode connected BJT $D_1$ (350) is connected to diode $D_{NS1}$ (315). A last resistor $R_{2N}$ (348) in the second resistor ladder (345) is connected in series circuit arrangement to a diode connected BJT $D_2$ (355). The diode connected BJT $D_2$ (355) is connected to diode $D_{NS2}$ (320). The term "diode connected" in the case of a bipolar transistor is used to denote the instance when the base of the transistor is connected directly to the collector such that the transistor now functions as a diode. In a similar manner, the term "diode connected" refers to a FET when its gate is connected directly to its drain so that the FET functions as a diode.

The HV rectifier (300) further comprises a diode connected PMOS FET $M_{B1}$ (360), a diode connected PMOS FET $M_{B2}$ (362), and a diode connected PMOS FET $M_{B3}$ (364). The diode connected PMOS FET $M_{B1}$ (360) is connected to an output node $N_{OUT}$ (390). The diode connected PMOS FET $M_{B3}$ (364) is connected in series circuit arrangement to the gate of PMOS FET $M_{11}$ (327) in the first FET stack (325), the gate of PMOS FET $M_{21}$ (332) in the second FET stack (330), and the resistors $R_{11}$ and $R_{21}$ of the respective resistor ladders (340, 345). The PMOS FETs $M_{B1}$ (360) to $M_{B3}$ (364) and resistor ladder (340) comprising N resistors $R_{11}$ through $R_{1N}$ (343) and resistor ladder (345) comprising N resistors $R_{21}$ through $R_{2N}$ (348) establishes a bias voltage at node A (373) equal to $V_{DD}$ minus the voltage drop across the PMOS FETs $M_{B1}$ (360) to $M_{B3}$ (364). The resistance values for the resistors in resistor ladder (340) are selected to ensure that each of the corresponding FETs in FET stack (325) have equal voltage drops across their respective source to drain terminals and that all of the FETs in FET stack (325) are operating below their breakdown voltages. Similarly, the resistance values for the resistors in resistor ladder (345) are selected to ensure that each of the corresponding FETs in FET stack (330) have equal voltage drops across their respective source to drain terminals and that all of the FETs in FET stack (330) are operating below their breakdown voltages.

The bulk terminals of all the PMOS FETs are connected to their corresponding source terminals so that the voltage across the drain and source terminals of all the PMOS FETs will not exceed the transistor operating voltage limits.

Figure 4:
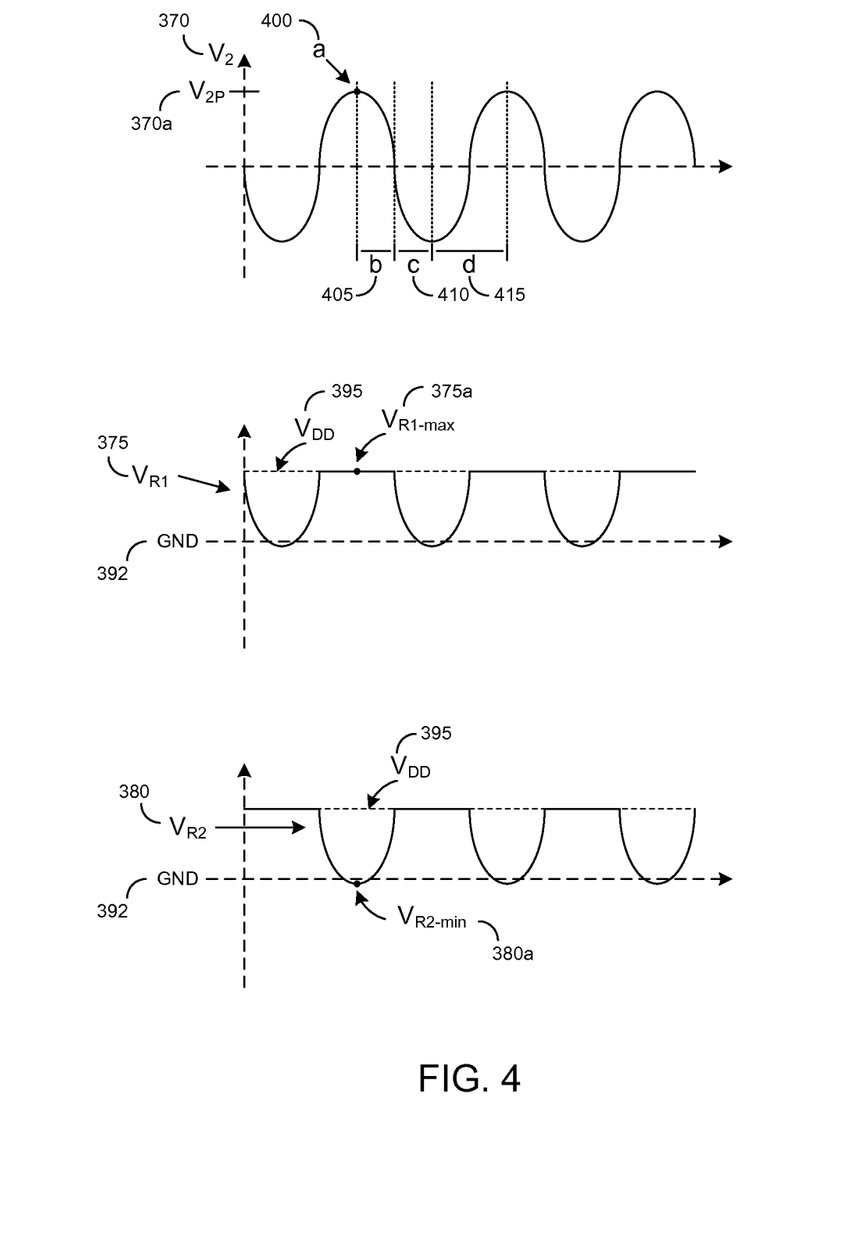
FIG. 4 shows voltage waveforms for the high voltage full wave rectifier shown in FIG. 3.

The following discussion of the operation of the HV rectifier (300) makes reference to both FIGS. 3 and 4. FIG. 4 shows voltage waveforms for the high voltage full wave rectifier (300) shown in FIG. 3 under no load conditions. In particular, FIG. 4 shows, as a function of time, an induced voltage $V_2$ (370), a voltage $V_{R1}$ (375), a voltage $V_{R2}$ (380), and an output voltage $V_{DD}$ (395), also shown in FIG. 3. Specifically, time designations referred to as a first case a (400), second case b (405), and third case c (410) will be described in detail.

Case a: $V_{R1}$ at maximum, $V_{R2}$ at minimum

For the first case a (400) where the induced voltage $V_2$ (370) is at a positive peak value $V_{2P}$ (370a). Specifically, the voltage $V_{R1}$ (375) is at a maximum value $V_{R1-max}$ (375a) and $V_{R2}$ (380) is at a minimum value $V_{R2-min}$ (380a).

For simplicity, assume that the diode connected PMOS FETs $M_{B1}$ (360), $M_{B2}$ (362), and $M_{B3}$ (364) have the same width-to-length ratios and the same source-to-gate voltage, denoted as $V_{SGB}$. In this simplified case, an intermediate voltage $V_1$ (372) at a first intermediate node A (373) is $V_1 = V_{DD} - 3V_{SGB}$.

The diode connected BJT $D_1$ (350) is forward biased when $V_{R1} < V_1 - V_{D1}$, where $V_{D1}$ is the diode voltage drop of the BJT $D_1$ (350). However, in case a (400), the maximum value $V_{R1-max}$ (375a) of $V_{R1}$ (375) causes the diode connected BJT $D_1$ (350) to be reverse biased and consequently, no significant current flows through the first resistor ladder (340). As a result, the gate voltages of the PMOS FETs $M_{11}$ (327) through $M_{1N}$ (328) in the first FET stack (325) are approximately the same as the voltage $V_1$ (372).

The drain voltage of the PMOS FET $M_{1N}$ (328) is the voltage $V_{R1-max}$ (375a), and the gate voltage of each PMOS FET $M_{11}$ (327) through $M_{1N}$ (328) is approximately the intermediate voltage $V_1$ (372). Consequently, the PMOS FETs $M_{11}$ (327) through $M_{1N}$ (328) are operating in triode mode since $V_{DG} \approx V_{R1-max} - V_1 > |V_{TP}|$ for each of the PMOS FETs in the first FET stack (325). Accordingly, the state of any of the FETs at any instant of time, that is whether they are biased off or saturated in the on mode or operating in the triode mode is dependent upon the magnitude and polarity of the source, drain and gate voltages of each device. The triode mode is understood by those skilled in the art to denote the linear region of operation for the device.

The source-to-gate voltage $V_{SG}$ of PMOS FET $M_{10}$ (305) is equal to $V_{DD} - (V_1 + |V_{TP}|)$, which is sufficiently large such that PMOS FET $M_{10}$ (305) is operating in the triode mode. As a result, the voltage $V_{R1}$ (375) supplies current from the first node $N_{R1}$ (376) through the PMOS FETs $M_{1N}$ (328) through $M_{10}$ (305) to the output node $N_{OUT}$ (390). Aside from the small voltage drops due to the on-resistance of the PMOS FETs $M_{1N}$ (328) through $M_{10}$ (305), the maximum value $V_{R1-max}$ (375a) of the voltage $V_{R1}$ (375) is essentially tied to the DC output voltage $V_{DD}$ (395).

Since $V_{R1}$ is greater than the ground potential, the diode $D_{NS1}$ (315) is reverse biased. Also, the minimum value for the voltage $V_{R2}$ (380), denoted as $V_{R2-min}$ (380a), is at least one diode drop $V_{NSD}$ below the ground terminal (392). Consequently, the diode $D_{NS2}$ (320) is forward biased and the voltage $V_{R2}$ (380) supplies current from the node $N_{R2}$ (381) to the ground terminal (392).

The diode connected BJT $D_2$ (355) is forward biased when $V_{R2} < V_1 - V_{D2}$, where $V_{D2}$ is a diode voltage drop of the BJT $D_2$ (355). The small value for the voltage $V_{R2-min}$ (380a) drives the diode connected BJT $D_2$ (370) to be forward biased. Consequently, current flows from the output node $N_{OUT}$ (390) through the diode connected PMOS FETs $M_{B1}$ (360) through $M_{B3}$ (364) to the intermediate node A (373). The current then flows from the intermediate node A (373) through the second resistor ladder (345) to intermediate node B (374). The current flows from the intermediate node B (374) through the diode connected BJT $D_2$ (355) and through the diode $D_{NS2}$ (320) to ground terminal (392).

Since the diode connected BJT $D_2$ (355) is forward biased, current flows through the second resistor ladder (345) and the gate voltage $V_{G2k}$ of a k-th PMOS FET $M_{2k}$ (334) in the second FET stack (330) can be expressed as the following equation:

$$V_{G2k} = \frac{[V_1 - (V_{R2} + V_{D2})]\sum_{i=k}^{N} R_{2i}}{\sum_{j=1}^{N} R_{2j}} + V_{R2} + V_{D2}$$

where $V_1 - (V_{R2} + V_{D2})$ is the voltage difference between the intermediate node A (373) and the intermediate node B (374), where $$\sum_{i=k}^{N} R_{2i}$$

is the total resistance of resistors $R_{2k}$ through $R_{2N}$, and $$\sum_{j=1}^{N} R_{2j}$$

is the total resistance of the second resistor ladder (345).

As a result, high voltage difference between the output voltage $V_{DD}$ (395) and the voltage $V_{R2}$ (380) will be shared between the PMOS FETs $M_{20}$ (310) through $M_{2N}$ (333). Since the drain voltage of PMOS FET $M_{10}$ (305), denoted as $V_d(M_{10})$, has a value close to the output voltage $V_{DD}$ (395), the gate-to-source voltage of PMOS FET $M_{20}$ (310), denoted as $V_{GS}(M_{20})$, is given by $V_{GS}(M_{20}) = V_{DD} - V_D(M_{10}) \approx 0$. The PMOS FET $M_{20}$ (310) operates in the cutoff region since the condition $V_{GS}(M_{20}) > V_{TP}$ is satisfied. Consequently, negligible current flows through PMOS $M_{20}$ (310) as well as the PMOS FETs $M_{21}$ (332) through $M_{2N}$ (333) in the second FET stack (330). As a result, the source-to-gate voltage of a k-th PMOS FET $M_{2k}$ (334), denoted as $V_{SG2k}$, is approximately equal to $|V_{TP}|$.

The second FET stack (330) is adapted to withstand a large voltage difference between the output voltage $V_{DD}$ (395) to the voltage $V_{R2}$ (380) to prevent the PMOS FETs $M_{20}$ (310) through $M_{2N}$ (333) from operating under stress conditions. Stress conditions are understood to be operation of MOSFETs at voltages greater than their breakdown voltage and that the MOSFETs will be functioning with terminal voltages beyond their optimum or recommended terminal voltage difference limits. In order to prevent PMOS FETs $M_{21}$ (332) through $M_{2N-1}$ from operating under stress conditions, voltage across each resistor $R_{21}$ through $R_{2N-1}$ is less than the smaller of $BV\{GD_{2k}\} + |V_{TP}|$ and $BV\{SD_{2k}\}$, where $BV\{GD_{2k}\}$ and $BV\{SD_{2k}\}$ are the gate to drain breakdown voltage and the source to drain breakdown voltage, respectively, of the k-th PMOS FET in the second FET stack (333), where k is a value between 1 through N−1. Additionally, to avoid operating under stress conditions, the gate to drain breakdown voltage of the last PMOS FET $M_{2N}$ (333) in the second FET stack (330), denoted as $BV\{GD_{2N}\}$, is greater than $V_{R2N} + V_{D2}$, where $V_{R2N}$ is the voltage across the last resistor $R_{2N}$ (348) of the second resistor ladder (345).

To obtain a maximum value for the DC output voltage $V_{DD}$ (395), which is limited by the diode breakdown voltage of the NWell/substrate diodes for PMOS FET $M_{20}$ (310), denoted as $BV\{NSD\}$, the number of PMOS FETs in the second FET stack (330) is given by the following equation:

$$N = \left[\frac{BV\{NSD\}}{\min[BV\{GD_{2k}\} + |V_{TP}|, BV\{SD_{2k}\}]} - 1\right]$$

For an exemplary 0.18 um CMOS process, N is equal to 3 and 6 for 3.3 V input/output PMOS FETs and 1.8 V normal PMOS FETs (with 2 V maximum limits), respectively. Typically, the breakdown voltage for the 3.3 V PMOS is about 3.6 V. As will be discussed later in more detail for the Voltage Doubler circuit of FIG. 5, the individual diodes $D_{NS1}$ (315) and $D_{NS2}$ (320) may be replaced by and are functionally equivalent to "active diodes" which are circuits, comprising a MOSFET and a comparator, that provides unidirectional current flow when the output of the comparator causes the MOSFET to be forward biased. A characteristic of active diodes is that there is essentially no voltage drop across the active diode when the MOSFET is forward biased.

Case b: $V_{R1} \geq V_{R2}$, $V_{2P} > V_{R1} - V_{R2} \geq 0$

For the second case b (405) when the induced voltage $V_2$ (370) begins to drop from the peak value $V_{2P}$ (370a). The drain voltage of PMOS FET $M_{10}$ (305) and the voltage $V_{R1}$ (375) remain essentially tied to the output voltage $V_{DD}$ (395) since the PMOS FET $M_{10}$ (305) continues to operate in the triode region.

However, since the value of the voltage $V_{R2}$ (380) is increasing in case b (405), the diode $D_{NS2}$ (320) is reverse biased and no current flows from the output node $N_{OUT}$ (390) to the ground terminal (392). Note that both diode $D_{NS1}$ (315) and diode $D_{NS2}$ (320) are reverse biased. Therefore, current flows only from the output node $N_{OUT}$ (390) to node $N_{R2}$ (381) by flowing through the diode connected PMOS FETs $M_{B1}$ (360) through $M_{B3}$ (364), the second resistor ladder (345), and the diode connected BJT $D_2$ (355), keeping intermediate voltage $V_1$ (372) relatively constant.

Case c: $V_{R1} < V_{R2}$, $|V_{2P}| \geq |V_{R1} - V_{R2}|$

Finally, for the third case c (410) when the induced voltage $V_2$ (370) becomes negative and continues to decrease. As the voltage $V_{R2}$ (380) increases, the gate voltage applied to PMOS FET $M_{10}$ (305) is not sufficiently large as to tie the voltage $V_{R1}$ (375) to the output node $N_{OUT}$ (390) and the voltage $V_{R1}$ (375) begins to decrease. The PMOS FET $M_{10}$ (305) enters cutoff mode when $V_{R1} < V_{DD} - |V_{TP}|$.

When the voltage $V_{R2}$ (380) further increases to a value larger than $V_1 - V_{D2}$, the diode connected BJT $D_2$ (320) begins to operate in reverse bias. As a result, no significant current flows through the resistors $R_{21}$ through $R_{2N}$ in the second resistor ladder (345).

The status of each transistor, at this point, is given as follows: the diode connected BJT $D_1$ (350) is reverse biased, the diode connected BJT $D_1$ (355) is reverse biased, the PMOS FETs $M_{10}$ (305) through $M_{1N}$ (328) are operating in the cutoff mode, and the PMOS FETs $M_{20}$ (310) through $M_{2N}$ (333) are operating in the cutoff mode, and the diode connected PMOS FETs $M_{B1}$ (360) through $M_{B3}$ (364) are operating in the cutoff mode. The intermediate voltage $V_1$ (372) may increase to about $V_{DD} - 3|V_{TP}|$ and remain at the voltage $V_{DD} - 3|V_{TP}|$ due to the charge stored on a capacitor $C_P$ (366).

As the voltage $V_{R1}$ (375) decreases further and reaches one diode drop $V_{NSD}$ below the ground terminal (392), the diode $D_{NS1}$ (315) becomes forward biased. Consequently, current flows from node $N_{R1}$ (376) to the ground terminal (392). On the other hand, as the voltage $V_{R2}$ (380) increases further, the PMOS FETs $M_{20}$ (310) through $M_{2N}$ (333) begin to operate in the triode mode. The node $N_{R2}$ (381) becomes tied to the output node $N_{OUT}$ (390), and thus current flows from the node $N_{R2}$ (381) to the output node $N_{OUT}$ (390).

The gate voltages $V_{G2k}$ are approximately equal to the intermediate voltage $V_1$ (372) since negligible current flows through the second resistor ladder (345). At this instance, the PMOS FETs $M_{B1}$ through $M_{B3}$ are in a saturation mode and conducting current through the resistor ladder (340). The PMOS FETs in the second PMOS stack (330), namely PMOS FETs $M_{21}$ (332) through $M_{2N}$ (333) operate in triode mode and will remain in triode mode until the induced voltage $V_2$ (370) becomes positive. Consequently, the voltage $V_{R2}$ (380) supplies current from the node $N_{R2}$ (381) flows to the output node $N_{OUT}$ (390) through transistors $M_{2N}$ (333) and $M_{20}$ (310) until the induced voltage $V_2$ (370) becomes positive.

When the induced voltage $V_2$ (370) reaches its negative peak $-V_{2P}$ in case c (410), the operation of the left and right circuit branches shown in FIG. 3 are reversed in relation to case a (400). The operations will reverse again between the beginning of a fourth case d (415) and the end of the fourth case d (415).

The DC output voltage $V_{DD}$ (395) is approximated by the following equation:

$$V_{DD} \approx |V_{R1} - V_{R2}|_{peak} - (N+1)V_{SD} - V_{NSD}$$

where, for simplicity, the source to drain voltage of each of the PMOS FETs $M_{10}$ (305) through $M_{1N}$ (328) as well as $M_{20}$ (310) through $M_{2N}$ (333) are assumed to be equal and denoted as $V_{SD}$. From the above equation, it can be seen that the output voltage $V_{DD}$ (395) is at least about 0.7 V, corresponding to the forward diode drop $V_{NSD}$, lower than the peak induced voltage $V_{2P}$ (370a). Additionally, the output voltage $V_{DD}$ (395) can be maximized by increasing the PMOS FET widths, which reduces the value of $V_{SD}$. Additionally, the $V_2$ (370) curve as shown in FIG. 4, has a peak to peak value of about 28 V at a frequency of 100 kHz.

Although the foregoing circuit description has been undertaken utilizing PMOS FET devices, as mentioned previously, it is to be understood that a complementary circuit for a high voltage full wave rectifier may be implemented utilizing NMOS FET devices taking into account the corresponding appropriate voltage polarities for proper circuit operation as understood by one skilled in the art.

HV Voltage Doubler Design

By way of background and with reference to FIG. 1, to acquire a large value for the induced voltage $V_2$ (115), the coil L (120) requires more windings, which generally results in an increase in the physical size of the coil L (120). Such an increase in the physical size of the coil L (120) may not be desirable for small biomedical implantable devices. However, if a voltage doubler is employed, a certain required DC output voltage $V_{DC}$ (130) can be obtained with peak to peak value of the induced voltage $V_2$ (115) reduced by half.

In discrete implementations, a voltage doubler generally utilizes two diodes. Both a positive supply rail $V_{DD}$ and a negative supply rail $V_{SS}$ are provided. An NWell/p-substrate diode can be used to supply the negative supply current. An overall voltage doubler output $V_{DD} - V_{SS}$ is equal to the peak to peak value of the induced voltage minus two diode drops. However, in order to maximize the voltage doubler circuit output, transistors with active control circuits may be used to realize the two required diodes to minimize the overall voltage drops.

FIG. 5 shows an exemplary embodiment of a high voltage (HV) voltage doubler (500). The HV voltage doubler (500) is adapted for use with an induced voltage $V_2$ (505). The voltage doubler (500) generates a positive supply voltage $V_{DD}$ (510) and a negative supply voltage $V_{SS}$ (515). An overall DC output voltage $V_{Doub}$ (520) is given by $V_{Doub} = V_{DD} - V_{SS}$. With Vss having a negative potential and a magnitude equal to $V_{DD}$, the output of the doubler circuit will be twice the value of $V_{DD}$. To maximize the output voltage $V_{Doub}$ (520), the two diodes generally used in voltage doublers are replaced by transistors with active control circuits. In particular, the transistors are $M_{P0}$ (525) and $M_{NO}$ (530) and the active control circuits are a first comparator $A_P$ (550) and a second comparator $A_N$ (560) respectively.

High voltage operations are achieved by connecting in series circuit arrangement a PMOS FET stack (526) to PMOS FET $M_{P0}$ (525), wherein the PMOS FET stack (526) comprises PMOS FETs $M_{P1}$ through $M_{PN}$, and by connecting in series circuit arrangement a NMOS FET stack (530) to NMOS FET $M_{NO}$ (531), wherein the NMOS FET stack (530) comprises NMOS FETs $M_{NN}$ through $M_{N1}$. The PMOS FETs $M_{P0}$ (525) through $M_{PN}$ are connected drain-to-source in series circuit arrangement. The NMOS FETs $M_{NN}$ through $M_{NO}$ (530) are connected source to drain in series circuit arrangement. A first resistor ladder (528), comprising resistors $R_{P1}$ through $R_{PN}$, is connected with the PMOS FET stack (526). The resistor $R_{PN}$ in the first resistor ladder (528) is connected in series with a diode connected BJT $Q_P$ (535). A second resistor ladder (533), comprising resistors $R_{N1}$ through $R_{NN}$, is connected with the NMOS FET stack (531). The resistor $R_{NN}$ in the second resistor ladder (533) is connected in series with a diode connected BJT $Q_N$ (540). The NMOS FETs are isolated from the p-substrate using the DNWell option such that their bulk terminals are connected to their corresponding source terminals.

The voltage doubler (500) further comprises the first comparator $A_P$ (550) and second comparator $A_N$ (560). The first comparator $A_P$ (550) includes a (positive) input terminal (552) a (negative) input terminal (553) and an output terminal $N_{AP}$ (554). The positive voltage supply $V_{DD}$ (510) is applied to input terminal (552) of the first comparator $A_P$ (550) while a drain voltage $V_{DP0}$ (545) of PMOS FET $M_{P0}$ (525) is applied to input terminal (553).

Similarly, the second comparator $A_N$ (560) includes a (positive) input terminal (562) a (negative) input terminal (563) and an output terminal $N_{AN}$ (564). The negative voltage supply $V_{SS}$ (515) is applied to input terminal (563) while a source voltage $V_{SN0}$ (570) of NMOS FET $M_{NO}$ (530) is applied to input terminal (562).

Figure 6:
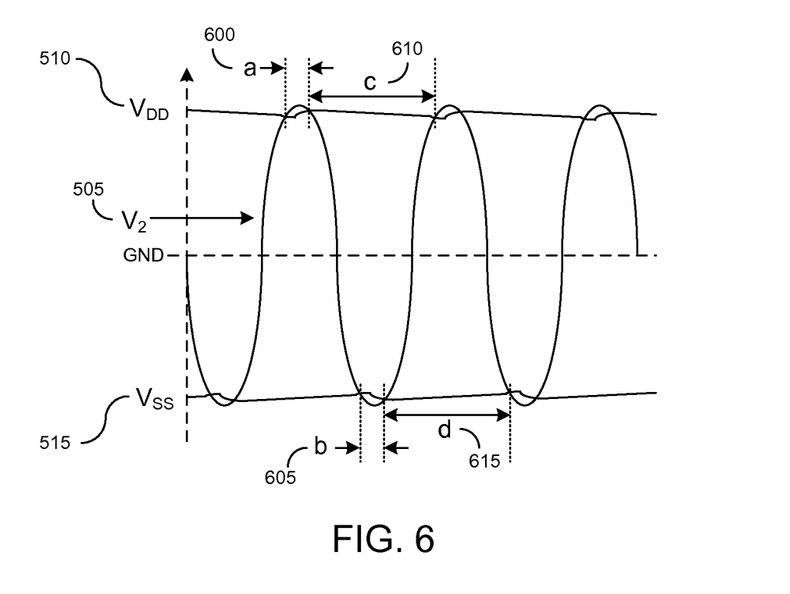
FIG. 6 shows voltage waveforms for the HV voltage doubler shown in FIG. 5.

Referring now to both FIGS. 5 and 6, FIG. 6 shows voltage waveforms for the HV voltage doubler (500) shown in FIG. 5. In particular, FIG. 6 shows, as a function of time, the induced voltage $V_2$ (505), the positive voltage supply $V_{DD}$ (255), and the negative voltage supply $V_{SS}$ (510). Specifically, a first case a (600) and second case b (605) will be described in detail below.

Case a: $V_2 > V_{DD}$

For case a (600) when the induced voltage $V_2$ (505) increases toward its positive peak value and becomes larger than the output voltage $V_{DD}$ (510) the large value of $V_2$ (505) drives the PMOS FETs $M_{P1}$ through $M_{PN}$ in the PMOS FET stack (526) into the triode mode. Additionally, the diode connected BJT $Q_P$ (535) reverse biased and thus does not conduct any significant current and consequently, no current flows through the resistors in a first resistor ladder (528). With no voltage drop across the resistors in the first resistor ladder (528), the gate voltage of each PMOS FET in the PMOS FET stack (526) is about equal to a voltage $V_{P1}$ (575). Since resistance of each PMOS FET is negligible, most of the induced voltage $V_2$ (505) appears as drain voltage $V_{DP0}$ (545) and at comparator $A_P$ (550) input terminal (553).

When comparator $A_P$ (550) detects that the drain voltage $V_{DP0}$ (545) is higher than the output voltage $V_{DD}$ (510) by a small offset voltage $V_{POS}$ (not shown) set in the comparator A$_P$ (550), the gate voltage applied to PMOS FET M$_{P0}$ (525) is driven to a value lower than V$_{DD}$ so as to turn on PMOS FET M$_{P0}$ (525). Since PMOS FET M$_{P0}$ (525) and the PMOS FETs in the PMOS FET stack (526) are turned on, current flows from node N$_{IN}$ (506) to output node N$_{OUT-DD}$ (511).

A small offset voltage V$_{POS}$ (not shown) may be used to compensate for comparator A$_P$ (550) delay in turning the PMOS FET M$_{P0}$ (525) off. Use of voltage offsets for such compensation is shown in "An Efficiency-Enhanced Integrated CMOS Rectifier with Comparator-Controlled Switches for Transcutaneous Powered Implants," by S. Guo and H. Lee, Proc. IEEE 2007 CICC, pp. 385-388, September 2007, which is incorporated herein by reference in its entirety.

Conversely, the source voltage V$_{SN0}$ (570) at NMOS FET M$_{NO}$ (530) is higher than V$_{SS}$ (515) and is given as V$_{N1}$–V$_{TN}$. Therefore, the output of the second comparator A$_N$ (560) is at a value of V$_{SS}$ (515) (i.e. logic 0) to cause the NMOS FET M$_{NO}$ (530) to be turned off. Since the NMOS FET M$_{NO}$ (530) is turned off, no current flows from put node N$_{IN}$ (506) to node N$_{OUT-SS}$ (516).

At such time, the diode connected BJT Q$_N$ (540) is forward biased because of the large value of the induced voltage V$_2$ (505). Since current flows through the second resistor ladder (533) the gate voltages of the NMOSs M$_{N1}$ through M$_{NN}$ are set by the voltage divider comprising the BJT Q$_N$ (540) and the resistors R$_{N1}$ through R$_{NN}$. Therefore, the NMOS FETs in the NMOS FET stack (531) will not be under stress conditions so long as breakdown voltages are not reached When the induced voltage V$_2$ (505) and thus the drain voltage V$_{DP0}$ (545), decreases below a threshold V$_{DD}$+V$_{POS}$, the comparator A$_P$ (550) output node N$_{AP}$ (554) is driven to a value equal to V$_{DD}$ and the PMOS FET M$_{P0}$ (525) is turned off. Once the PMOS FET M$_{P0}$ (525) turns off, current cannot flow from the output node N$_{OUT-DD}$ (511) to the input node N$_{IN}$ (506). The voltage offset V$_{POS}$ of the comparator A$_P$ (not shown) is added in order to minimize current flowing from the output node N$_{OUT-DD}$ (511) to the input node N$_{IN}$ (506) due to delay of the comparator A$_P$ (550) in turning off the PMOS FET M$_{P0}$ (525). By adding the voltage offset V$_{POS}$, the comparator A$_P$ (550) turns off the PMOS FET M$_{P0}$ (525) slightly earlier than the comparator A$_P$ (550) would have turned off the PMOS FET M$_{P0}$ (525) had there been no voltage offset V$_{POS}$ in order to compensate for the delay.

Consequently, the positive voltage supply V$_{DD}$ (510) is tied to a constant value since only negligible current flows from the output node N$_{OUT-DD}$ (511) to the input node N$_{IN}$ (506). The positive voltage supply V$_{DD}$ (510) will be tied to this constant value until the end of a time period c (610), when the operations in case a (600) will repeat.

Case b: V$_2$<V$_{SS}$

For the second case b (605) where the induced voltage V$_2$ (505) is in the vicinity of its negative peak value –V$_{2p}$. The diode connected BJT Q$_N$ (540) is reverse biased and thus no current flows through the second resistor ladder (533). The NMOS FETs M$_{NN}$ through M$_{N1}$ in the NMOS FET stack (531) operate in the triode mode with their gate voltages equal to a voltage V$_{N1}$ (580). Since resistance across each NMOS FET is negligible, most of the induced voltage V$_2$ (505) appears as a source voltage V$_{SN0}$ (570) of NMOS FET M$_{NO}$ (530).

When the induced voltage v$_2$ (505) is near its negative peak, the output of comparator A$_N$ (560) will be higher than V$_{SS}$ so as to turn on the NMOS FET M$_{NO}$ (530). Consequently, current flows from the input node N$_{IN}$ (506) to the output node N$_{OUT-SS}$ (516). Similar to the case for the first comparator A$_P$ (550), the second comparator A$_N$ (560) also has a voltage offset V$_{NOS}$ (not shown) that compensates for delay of the comparator A$_N$ (560) in turning off the NMOS FET M$_{NO}$ (530) when the induced voltage V$_2$ (505) increases above V$_{SS}$–V$_{NOS}$.

The negative voltage supply V$_{SS}$ (515) remains at a constant value since only negligible current flows from the output node N$_{OUT-SS}$ (516) to the input node N$_{IN}$ (506). The negative voltage supply V$_{SS}$ (515) will be tied to this constant value until the end of a time period d (615), upon which the operations in case b (605) will repeat.

A resistor R$_1$ (590) and a resistor R$_2$ (591) are used to ensure that some DC biasing currents exist for both the first comparator A$_P$ (550) and the second comparator A$_N$ (560) and the capacitors C$_1$ and C$_2$ connected in parallel with resistors R$_1$ (590) and R$_2$ (591) respectively, provide relatively constant supply voltages for the comparators A$_P$ (550) and A$_N$ (560). Additionally, capacitor C$_4$ (512) coupled between output node N$_{OUT-DD}$ (511) (V$_{DD}$) and ground and capacitor C$_5$ (513) coupled between output node N$_{OUT-SS}$ (516) (V$_{SS}$) and ground function as filter capacitors for signal smoothing.

Since both the positive voltage supply V$_{DD}$ (510) and the negative voltage supply V$_{SS}$ (515) are tied to their respective constant values, the voltage doubler voltage output V$_{Doub}$ (520), given by V$_{Doub}$=V$_{DD}$–V$_{SS}$, is also substantially a constant value.

Figure 7:
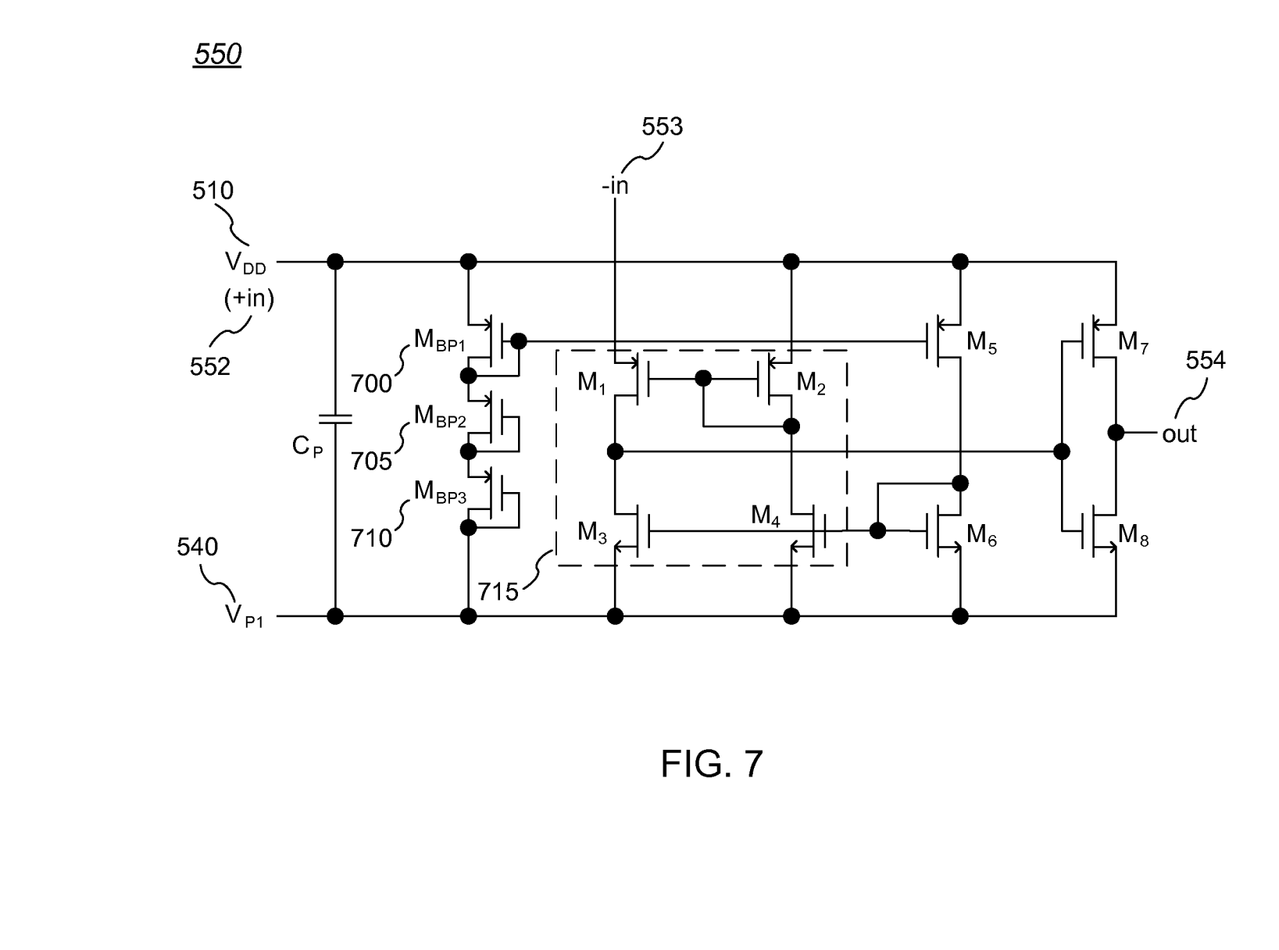
FIG. 7 shows an exemplary embodiment of a comparator.

FIG. 7 shows an exemplary embodiment of the comparator A$_P$ (550). A diode connected PMOS FET M$_{BP1}$ (700), a diode connected PMOS FET M$_{BP2}$ (705), and a diode connected PMOS FET M$_{BP3}$ (710) are used for establishing supply rails. The supply rails are the voltages V$_{DD}$ (510) and V$_{P1}$ (575), as shown in FIG. 5. The capacitor C$_P$ serves to ensure that the voltage between V$_{DD}$ and V$_{P1}$ is relatively constant. A voltage difference between the voltage V$_{DD}$ (510) at the first terminal (552) of the comparator A$_P$ (550) and the voltage V$_{P1}$ (540) is set at 3V$_{SG}$ due to voltage drops of each of the diode connected PMOS FETs (700, 705, 710). In the current, exemplary embodiment a typical value for V$_{SG}$ is about 1 volt. The diode connected PMOSs (700, 705, 710) are also used for generating a bias current for the comparator core (715) comprising PMOS FETs M$_1$ through M$_4$. An output from the comparator core (715) is further amplified by PMOS FETs M$_7$ and M$_8$. Since the comparator A$_P$ (550) is supplied with a voltage of V$_{DD}$–V$_{P1}$, the gate voltage swing of the PMOS FET M$_{P0}$ (525) in FIG. 5 is limited to about 3V$_{SG}$. The offset V$_{POS}$ is obtained by adjusting the width-to-length ratio of the PMOS FETs M$_1$ and M$_2$ as well as the currents on PMOS FETs M$_3$ and M$_4$.

The design of the second comparator A$_N$ (560) is similar to the design of the first comparator A$_P$ (550) except that all PMOS FETs in the comparator A$_P$ (550) are replaced with NMOS FETs and all NMOS FETs in the comparator A$_P$ (550) are replaced with PMOS FETs.

Specifically, in practice the voltage waveforms shown in FIG. 6 illustrate example numerical results for the circuit shown in FIG. 5. For such example, the voltage doubler (500) was set to have an output power P$_{out}$ of 8.85 mW. The induced voltage V$_2$ (505) has a peak to peak value of 13.93 V and a frequency of 100 kHz. The value for the positive supply V$_{DD}$ (510) is about 6.7 V and the value for the negative supply V$_{SS}$ (515) is about –6.6 V. The resulting voltage doubler output voltage V$_{Doub}$ (520) is V$_{Doub}$=V$_{DD}$–V$_{SS}$=13.3 V.

With reference to FIGS. 5 and 6, the HV voltage doubler (500) required the induced voltage V$_2$ (505) to have a peak to peak value of around 14 V in order to generate the voltage doubler DC output V$_{Doub}$ (520) of around 13.3 V. With reference to FIGS. 3 and 4, the high voltage full wave rectifier (300) required the induced voltage V$_2$ (370), shown in FIG. 3, to have a peak to peak value of around 28 V in order to generate the rectifier DC output $V_{DD}$ (510) of around 13.3 V.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A high voltage full wave rectifier and voltage doubler circuit implemented utilizing low voltage CMOS process transistors, said rectifier and voltage doubler circuit having an input terminal, first and second voltage rails, first and second output voltage terminals and a ground terminal, said input terminal being coupled to a time varying voltage signal, said rectifier and voltage doubler circuit comprising:
   a first plurality of mosfet transistors interconnected in series circuit arrangement between the first output terminal and the input terminal;
   a first comparator coupled across a first mosfet transistor in the first plurality of mosfet transistors wherein an output of the first comparator is coupled to the gate of the first mosfet transistor in the first plurality of mosfet transistors for controlling the state of the first mosfet transistor in the first plurality of mosfet transistors as a function of the voltage at the first output voltage terminal;
   a first plurality of resistors interconnected in series circuit arrangement, said first plurality of resistors coupled between the input terminal and the first voltage rail, wherein the gates of the remaining mosfet transistors in the first plurality of mosfet transistors are coupled to respective ones of the resistors in the first plurality of resistors for controlling the state of the mosfet transistor coupled thereto;
   a second plurality of mosfet transistors interconnected in series circuit arrangement between the second output terminal and the input terminal;
   a second comparator coupled across a first mosfet transistor in the second plurality of mosfet transistors wherein an output of the second comparator is coupled to the gate of the first mosfet transistor in the second plurality of mosfet transistors for controlling the state of the first mosfet transistor in the second plurality of mosfet transistors as a function of the voltage at the second output voltage terminal;
   a second plurality of resistors interconnected in series circuit arrangement, said second plurality of resistors coupled between the input terminal and the second voltage rail, wherein the gates of the remaining mosfet transistors in the second plurality of mosfet transistors are coupled to respective ones of the resistors in the second plurality of resistors for controlling the state of the mosfet transistor coupled thereto;
   a first capacitor coupled between the first output and ground; and
   a second capacitor coupled between the second output and ground.

2. The circuit of claim 1 further comprising: a first grounding resistor coupled between the first voltage rail and the ground terminal and a second grounding resistor coupled between the second voltage rail and the ground terminal.

3. The circuit of claim 2 further comprising a third capacitor coupled across the first grounding resistor and a fourth capacitor coupled across the second grounding capacitor.

4. The circuit of claim 1 further comprising a first diode interposed between the input terminal and the first plurality of resistors.

5. The circuit of claim 4 wherein the first diode comprises a bipolar transistor configured as a diode.

6. The circuit of claim 1 further comprising a second diode interposed between the input terminal and the second plurality of resistors.

7. The circuit of claim 6 wherein the second diode comprises a bipolar transistor configured as a diode.

8. The circuit of claim 1 wherein the first comparator is configured to generate said first voltage rail.

9. The circuit of claim 1 wherein the second comparator is configured to generate said second voltage rail.

* * * * *